US011398899B2

(12) United States Patent
Xue et al.

(10) Patent No.: US 11,398,899 B2
(45) Date of Patent: Jul. 26, 2022

(54) DATA PROCESSING DEVICE AND DATA PROCESSING METHOD

(71) Applicant: Shanghai Zhaoxin Semiconductor Co., Ltd., Shanghai (CN)

(72) Inventors: Gangru Xue, Beijing (CN); Zhenhua Huang, Beijing (CN); Yun Shen, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 46 days.

(21) Appl. No.: 16/819,294

(22) Filed: Mar. 16, 2020

(65) Prior Publication Data
US 2020/0382289 A1 Dec. 3, 2020

(30) Foreign Application Priority Data

May 28, 2019 (CN) .......................... 201910450726.8
May 28, 2019 (CN) .......................... 201910450727.2

(51) Int. Cl.
*H04L 9/08* (2006.01)
(52) U.S. Cl.
CPC .................. *H04L 9/0822* (2013.01)
(58) Field of Classification Search
CPC ... H04L 9/0822; H04L 9/0825; H04L 9/0897; H04L 2209/805
See application file for complete search history.

(56) References Cited

U.S. PATENT DOCUMENTS

| 6,256,733 B1 * | 7/2001 | Thakkar ............... H04L 9/0822 380/277 |
| 7,657,754 B2 | 2/2010 | Chambers et al. |
| 8,479,014 B1 | 7/2013 | Hu |

(Continued)

FOREIGN PATENT DOCUMENTS

| CN | 1043594 A | 7/1990 |
| CN | 1470972 A | 1/2004 |

(Continued)

OTHER PUBLICATIONS

Cohen, J., et al.; Towards a Trusted Hadoop Storage Platform Design Considerations of an AES Based Encryption Scheme with TPM Rooted Key Protections; 2013 IEEE 10th International Conference on Ubiquitous Interlligence & Computing and 2013 IEEE 10th International Conference on Autonomic & Trusted Computing; Dec. 2013; pp. 444-451.

(Continued)

*Primary Examiner* — Abiy Getachew
(74) *Attorney, Agent, or Firm* — McClure, Qualey & Rodack, LLP (57) ABSTRACT

A data processing method includes the following steps: a processor receives a symmetric wrapping key, and when an application needs to use a user private key, the processor executes an encryption and decryption instruction in a hardware-acceleration instruction-set. The encryption and decryption instruction is configured to apply the symmetric wrapping key to decrypt a wrapped private key that corresponds to the application to obtain the user private key. In addition, the symmetric wrapping key is stored in a model specific register of the processor.

18 Claims, 8 Drawing Sheets

(56) References Cited

U.S. PATENT DOCUMENTS

| | | |
|---|---|---|
| 10,097,349 B2 | 10/2018 | Grobman et al. |
| 2008/0229117 A1 | 9/2008 | Shin et al. |
| 2013/0254542 A1 | 9/2013 | Buer et al. |
| 2014/0025946 A1 | 1/2014 | Kim et al. |
| 2015/0078550 A1 | 3/2015 | Ferguson et al. |
| 2015/0381573 A1 | 12/2015 | Armatis |
| 2016/0269179 A1 | 9/2016 | White et al. |
| 2017/0063547 A1 | 3/2017 | Brandt et al. |
| 2017/0093802 A1* | 3/2017 | Norum ................ H04L 61/1511 |
| 2017/0230179 A1 | 8/2017 | Mannan et al. |
| 2018/0069749 A1* | 3/2018 | Singhal ............... H04L 41/0681 |
| 2018/0109947 A1 | 4/2018 | Kim et al. |
| 2018/0150644 A1 | 5/2018 | Khanna et al. |
| 2018/0191695 A1* | 7/2018 | Lindemann ......... H04L 63/0853 |
| 2019/0180778 A1* | 6/2019 | Abe ....................... G06F 3/062 |

FOREIGN PATENT DOCUMENTS

| | | |
|---|---|---|
| CN | 101268650 A | 9/2008 |
| CN | 101616142 A | 12/2009 |
| CN | 101783800 A | 7/2010 |
| CN | 102263637 A | 11/2011 |
| CN | 104012030 A | 8/2014 |
| CN | 104883256 A | 9/2015 |
| CN | 105612715 A | 5/2016 |
| CN | 106027503 A | 10/2016 |
| CN | 106301774 A | 1/2017 |
| CN | 107070657 A | 8/2017 |
| CN | 107896223 A | 4/2018 |
| WO | 2017147337 A1 | 8/2017 |

OTHER PUBLICATIONS

Ran, J.; "Cloud Storage Data Encryption Based On TPM;" Dec. 2014; pp. 1-50.

English abstract of "Cloud Storage Data Encryption Based On TPM;" p. 5 of publication.

Chinese language office action dated Jan. 11, 2022, issued in application No. CN 201910450727.2.

* cited by examiner

```
                                                    300
  ┌─────────────────┐   ┌─────────────────┐   ┌─────────────────┐   ┌─────────────────┐
  │ 310             │   │ 320             │   │ 330             │   │ 340             │
  │ generating the  │   │ receiving the   │   │ receiving a     │   │ when an         │
  │ symmetric       │   │ application     │   │ symmetric       │   │ application     │
  │ wrapping key by │   │ image of the    │   │ wrapping key    │   │ needs to use a  │
  │ the external    │ → │ application by  │ → │                 │ → │ user private    │
  │ key server, and │   │ the processor   │   │                 │   │ key, the        │
  │ use the         │   │ and installing  │   │                 │   │ processor       │
  │ symmetric       │   │ the application │   │                 │   │ executes an     │
  │ wrapping key to │   │ in the data     │   │                 │   │ encryption and  │
  │ encrypt the     │   │ processing      │   │                 │   │ decryption      │
  │ user private    │   │ device through  │   │                 │   │ instruction in  │
  │ key by a        │   │ the application │   │                 │   │ a hardware-     │
  │ symmetric       │   │ image           │   │                 │   │ acceleration    │
  │ encryption      │   │                 │   │                 │   │ instruction-set │
  │ algorithm, so   │   │                 │   │                 │   │ and the         │
  │ as to generate  │   │                 │   │                 │   │ encryption and  │
  │ the wrapped     │   │                 │   │                 │   │ decryption      │
  │ private key     │   │                 │   │                 │   │ instruction is  │
  │ stored in an    │   │                 │   │                 │   │ configured to   │
  │ application     │   │                 │   │                 │   │ apply the       │
  │ image of the    │   │                 │   │                 │   │ symmetric       │
  │ application     │   │                 │   │                 │   │ wrapping key to │
  │                 │   │                 │   │                 │   │ decrypt a       │
  │                 │   │                 │   │                 │   │ wrapped private │
  │                 │   │                 │   │                 │   │ key             │
  │                 │   │                 │   │                 │   │ corresponding   │
  │                 │   │                 │   │                 │   │ to the          │
  │                 │   │                 │   │                 │   │ application to  │
  │                 │   │                 │   │                 │   │ obtain the user │
  │                 │   │                 │   │                 │   │ private key     │
  └─────────────────┘   └─────────────────┘   └─────────────────┘   └─────────────────┘
```

DATA PROCESSING DEVICE AND DATA PROCESSING METHOD

CROSS REFERENCE TO RELATED APPLICATIONS

This application claims priority of China Patent Application No. 201910450727.2, filed on May 28, 2019, and China Patent Application No. 201910450726.8, filed on May 28, 2019, the entirety of which is incorporated by reference herein.

BACKGROUND OF THE INVENTION

Field of the Invention

The present disclosure relates to a technique for securely storing keys and, in particular, to a data processing device and data processing method suitable for a key involved in hardware encryption and decryption instructions.

Description of the Related Art

With the rapid development of the Internet and the Internet of Things, network and information security incidents are emerging one after another. Therefore, information security has garnered increased attention from countries and industries around the world. Especially in this era in which the application of new technologies such as cloud computing and big data is rapidly on the rise. Key information can often be obtained from massive data by data mining technology. This poses a serious threat to the information security of businesses and individuals.

The cryptographic algorithm is the core technology and basic support for information security. In addition, the security of the key itself is also an important factor affecting security. In some regulated industries, such as banking, healthcare, and e-commerce etc., these industries all need industry-recognized key management devices, such as a hardware security module (HSM), to protect sensitive information such as passwords and keys. The key is the cornerstone of information security, and the confidentiality of the key itself must be protected. Therefore, ensuring the confidentiality of the key itself used in the process of encryption and decryption using cryptographic algorithms without sneaking by others, has become one of the problems to be solved in the field.

BRIEF SUMMARY OF THE INVENTION

In accordance with one feature of the present invention, the present disclosure provides a data processing device. The data processing device includes a processor. The processor is configured to receive a symmetric wrapping key, when an application needs to use a user private key, the processor executes an encryption and decryption instruction in a hardware-acceleration instruction-set; the encryption and decryption instruction is configured to apply the symmetric wrapping key to decrypt a wrapped private key corresponding to the application to obtain the user private key. In addition, the symmetric wrapping key is stored in a model specific register of the processor.

In accordance with one feature of the present invention, the present disclosure provides a data processing method. The data processing method includes the following steps: receiving a symmetric wrapping key by a processor, and when an application needs to use a user private key, executing an encryption and decryption instruction in a hardware-acceleration instruction-set by a processor. The encryption and decryption instruction is configured to apply the symmetric wrapping key to decrypt a wrapped private key that corresponds to the application to obtain the user private key. In addition, the symmetric wrapping key is stored in a model specific register of the processor.

In summary, the data processing system and the data processing method of the present invention store a symmetric wrapping key using a model specific register with a high internal security level of the processor, and the processor executes an encryption and decryption instruction in a hardware-acceleration instruction-set to read the symmetric wrapping key from the model specific register, thereby improving the security of the symmetric wrapping key. In addition, when there are many symmetric wrapping keys to be stored, and the storage space in the model specific register inside the processor is limited, the symmetric wrapping key is encrypted by the CPU private key generated by the processor and then stored in external storage. In addition, the security of the symmetric wrapping key is ensured, and the scalability of the key storage space is realized. Other additional features and advantages of the present invention can be obtained by those skilled in the art, without departing from the spirit and scope of the application, by making some changes and retouching according to the data processing device and the data processing method disclosed in the implementation method of the present invention.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention is described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

This section describes the preferred mode of carrying out the application, and is intended to illustrate the spirit of the application and not to limit the scope of the application. It should be understood that the following embodiments can be implemented via software, hardware, firmware, or any combination of the above. The specifications of the Chinese commercial cryptographic algorithms (such as SM3 and SM4), which are defined by the Office of State Cryptography Administration, are used to assist in expressing the spirit of the application and are not intended to limit the scope of the application. The key protection method disclosed by the present invention is also applicable to data processing apparatus employing other cryptographic algorithms, such as the Advanced Encryption Standard (AES) algorithm.

The Chinese commercial cryptographic algorithm refers to a series of cryptographic algorithm standards promulgated by the Office of State Cryptography Administration, including SM1, SM2, SM3, SM4, SM7, SM9 and Zu Chongzhi cryptographic algorithm (ZUC). SM1, SM4, SM7 and ZUC belong to the symmetric encryption algorithm. SM2 and SM9 belong to the asymmetric cryptographic algorithm. SM3 is the cryptographic hash algorithm, which is the common hash algorithm.

Figure 1:
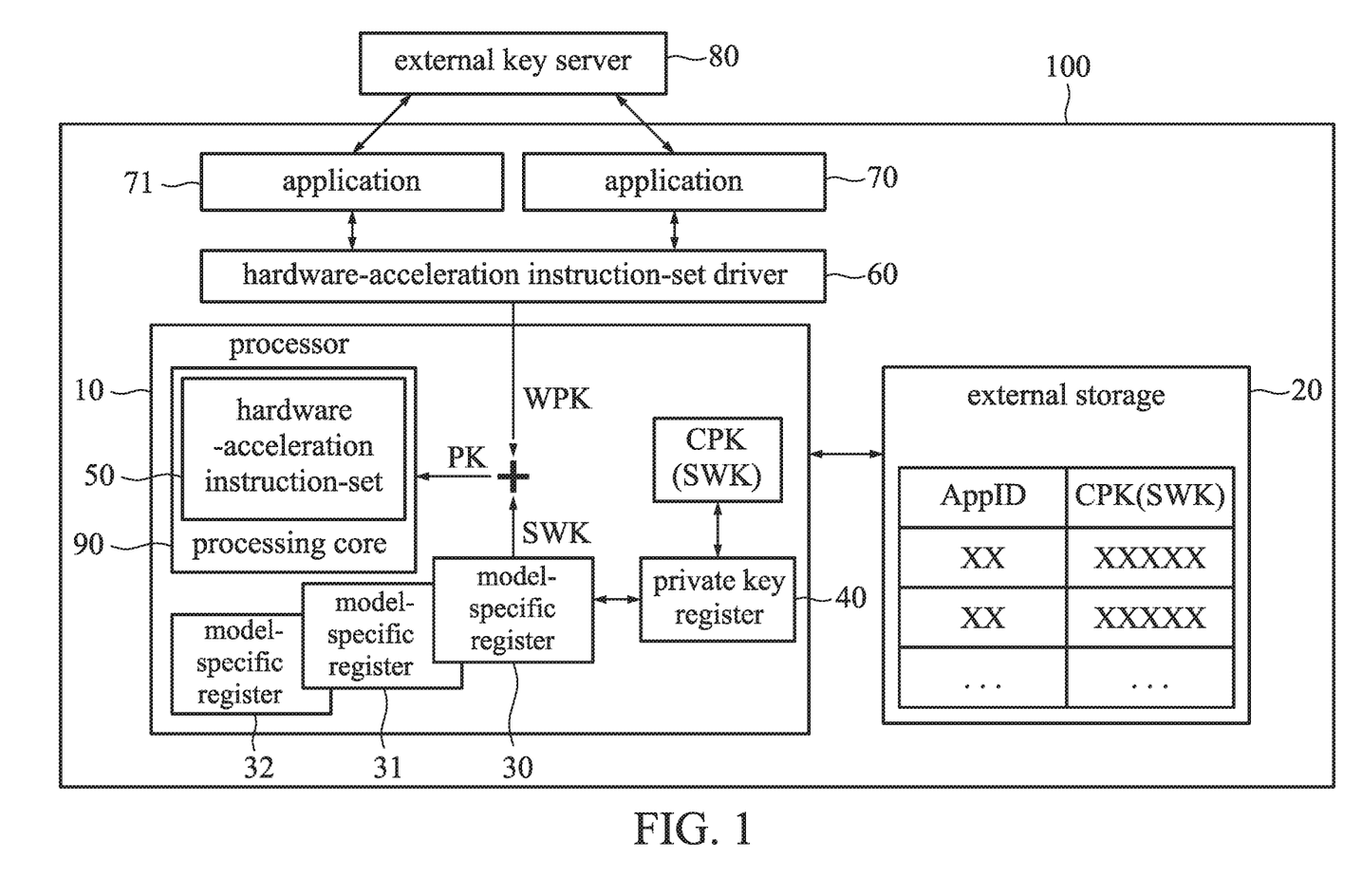
FIG. 1 is a block diagram of a data processing device in accordance with one embodiment of the present disclosure.

In one embodiment, please refer to FIG. 1, which is a block diagram of a data processing device 100 in accordance with one embodiment of the present disclosure. The data processing device 100 includes a processor 10 and an external storage 20.

In one embodiment, the processor 10 can be implemented by integrated circuit such as a micro controller, a microprocessor, a digital signal processor, an application specific integrated circuit (ASIC) or a logic circuit.

In one embodiment, the external storage 20 is a Non-Volatile Random Access Memory (NVRAM) or a Dynamic Random Access Memory (DRAM). In one embodiment, the external storage stores the application identification code AppID and its corresponding encrypted symmetric wrapping key CPK (SWK).

In one embodiment, the processor 10 includes a model specific registers (MSR) 30 to 32. The model specific registers 30 to 32 are registers of limited storage capacity, which are normally used to control the operation, function switching, debugging, tracking program execution, monitoring the performance of the processor 10, and the like. In the processor 10, the model specific registers 30 to 32 are located in the inside of the package of the processor 10. In addition, the model specific registers 30 to 32 do not allow to be accessed by components other than the processor 10 nor disclose their access addresses to the outside. In an embodiment, the processor 10 includes at least one processing core 90.

In one embodiment, the data processing device 100 includes a plurality of model specific registers 30 to 32.

In one embodiment, the data processing device 100 includes a private key register 40 for storing a CPU private key (CPK) generated by the processor 10.

In one embodiment, the processing core 90 further includes a hardware-acceleration instruction-set 50. The hardware-acceleration instruction-set 50 can be implemented via software, hardware, firmware, or any combination of the above. In one embodiment, the hardware-acceleration instruction-set 50 can be implemented in a microcode (or ucode) in one of the processing cores 90.

In one embodiment, the processor 10 and the external storage 20 can be implemented by hardware. The hardware-acceleration instruction-set driver (also called GMI driver) 60, the application programs 70, 71 can be implemented by software, hardware, firmware, or any combination thereof.

In one embodiment, the processor 10 can improve the performance of the cryptographic algorithm application by utilizing the hardware-acceleration instruction-set 50. It takes advantage of the computing ability of the processing core 90. In the traditional way of using cryptographic algorithms, it is more common to implement the corresponding cryptographic algorithms through software programming, which usually requires performing a large amount and complex programming. Take the open source software package OpenSSL as an example, the traditional cryptographic algorithms such as the Chinese commercial cryptographic algorithms SM3 and SM4 have about 200 to 300 lines of code. However, after the hardware implementation of these cryptographic algorithms, the algorithm that originally needed to be implemented by hundreds of lines of complex coding, now only needs to simply call or invoke a hardware instruction (such as an x86 macro instruction) to complete the corresponding operation. This greatly simplifies the complexity of the operation and brings great convenience to users or programmers. In the hardware-acceleration instruction-set 50, the specific instruction codes of the Chinese commercial cryptographic algorithms SM3 and SM4 are as follows:

| instruction | Opcode | description |
| --- | --- | --- |
| CCS_SM3 | 0xF3 0x0F 0xA6 0xE8 | SM3 instruction |
| CCS_SM4 | 0xF3 0x0F 0xA7 0xF0 | SM4 instruction |

At the same time, each instruction (such as SM3, SM4) in the hardware-acceleration instruction-set 50 can be packaged to provide an application programming interface (API) and a library suitable for upper-layer application development. It is convenient for users who need to develop upper-layer applications. It should be noted that the description of the cryptographic algorithm later in this specification uses the instructions (such as SM3, SM4) in the hardware-acceleration instruction-set 50 as an example. However, the present invention is not limited thereto, that is, the present invention can also adopt other cryptographic algorithms.

In one embodiment, during executing an application (e.g., the application 70 or 71), the most common attack encountered by the software is illegal tampering. Cryptographic algorithms implemented by software programming are also subject to this type of threat. However, there is no risk that the hardware will be tampered with. Therefore, after the cryptographic algorithm is implemented by hardware, the risk of illegal tampering of the cryptographic algorithm is eliminated. In addition, the attack way left to the attacker is correspondingly reduced. Moreover, after the cryptographic algorithm is hardwareized, less code is used to implement the algorithm. In addition, the amount of code that is called and used by the cryptographic algorithm will also decrease. This means that the probability of importing program errors in the program are greatly reduced, thus enhancing the robustness of the user program.

In addition, the cryptographic algorithm is hardwareized, which saves a lot of system overhead such as software calls. It can greatly improve the performance of the cryptographic algorithm application.

In one embodiment, the SM3 instruction in the hardware-acceleration instruction-set 50 can be used to verify the integrity of the file to ensure that the file or software used has not been tampered with by the attacker. The SM3 instruction of the hash algorithm can check for tampering of any length. In addition, due to the resulting data digest (hash value) is longer, it is more difficult to collide and is more secure. Therefore, the user only needs to call the SM3 instruction in the hardware-acceleration instruction-set 50 to calculate the digest value needed by the file or software. In addition, the digest value is compared with the verification value of the file to verify whether the file has been tampered with. This ensures the integrity of the files or software.

In one embodiment, regarding the SM4 instruction in the hardware-acceleration instruction-set 50, the SM4 instruction uses a symmetric encryption and decryption algorithm. That is, its encryption and decryption use the same key, which can be used for static data encryption, transmission data encryption, and application layer data encryption. The application of these three is described in detail below.

In terms of static data encryption, full disk encryption is a typical application for encrypting static data. In one embodiment, all data on the disk can be encrypted and stored by the SM4 instruction. When computer equipment that stores sensitive information such as personal privacy or trade secrets is lost or needs to be repaired, the use of full disk encryption protection can avoid the risk of information leakage. Especially for enterprise users, when the device is updated, with the help of full disk encryption, only the encryption and decryption key of the full disk encryption needs to be destroyed. In addition, the purpose of destroying the sensitive data on the old disk can be achieved. At the same time, the acceleration feature of the hardware-acceleration instruction-set 50 can make the full disk encryption have higher performance and greatly improve the user experience. In addition, under the requirements of security and reliability, some industries have requirements for encryption and decryption algorithms, such as using the SM4 algorithm to encrypt and decrypt data in the system. In this case, the SM4 instruction of the hardware-acceleration instruction-set 50 can be used instead of the traditional software-only implementation, thereby not only preventing the algorithm from being tampered with, but also improving the operation speed while meeting the compliance requirements of policies and regulations.

In terms of transmission data encryption, the SM4 instruction of the hardware-acceleration instruction-set 50 can protect the data in transmission. For example, when the client electronic device accesses the website using Hypertext Transfer Protocol Secure (HTTPS). After completing the initial key exchange, the client electronic device and the website server use a symmetric encryption algorithm to protect the data transmission between the two parties. In addition, in the field of cloud computing, data stored in a cloud environment involves personal privacy or business secrets, users are particularly concerned about the confidentiality of such data. In this case, the data needs to be encrypted and then transmitted to the cloud over the network. In this way, not only the confidentiality of data in the cloud environment can be ensured, but also the confidentiality of data during network transmission can be ensured. At this time, if the client electronic device of the browser or the cloud can support the SM4 hardware encryption and decryption instruction of the hardware-acceleration instruction-set 50, the security requirement of the user for data transmission can be satisfied.

In the aspect of application layer data encryption, the database is a typical application scenario. General databases support a security feature called Transparent Data Encryption (TDE). This feature can encrypt the contents of the database as a whole. Two of the three encryptions used are symmetric encryption: service master key and data encryption key. These can all utilize the hardware encryption instructions of the SM4 of the hardware-acceleration instruction-set 50.

The above SM3 and SM4 instructions in the hardware-acceleration instruction-set 50 can be applied to the present invention. However, the invention is not limited thereto. That is, the SM2, SM4, SM7, SM9, ZUC and other cryptographic algorithms of the hardware-acceleration instruction-set 50 can also be applied to the present invention.

Since the SM4 instruction uses a symmetric encryption and decryption algorithm, its encryption and decryption use the same key. Therefore, in the application of the various hardware-acceleration instruction-sets 50 described above, particularly the applications of the symmetric encryption and decryption instructions SM1, SM4, SM7 and ZUC, the security of the key itself is also important. In one embodiment, the external key server 80 is required to generate and protect sensitive information, such as a user's password, key, and the like.

In other words, the key is used to ensure information security, and the confidentiality of the key itself must be protected. Therefore, it is necessary to make sure that the key does not appear as the plaintext form in memory (for example, in flash memory). In order to ensure the security of the key used by the hardware-acceleration instruction-set 50, especially the key used by the symmetric encryption algorithm (hereinafter referred to as the symmetric wrapping key (SWK)), we implement a dedicated space inside the processor 10 to store these keys. Here we have designed some model specific registers 30 to 32 that only the processor 10 can access. The model specific registers 30 to 32 are private model specific registers for saving keys. In addition, a new SM4 instruction call mode is also designed, so that the SM4 instruction can find the required symmetric wrapping key SWK directly from the specified model specific register (for example, the model specific register 30) without taking it from the memory.

In one embodiment, the model specific registers 30 to 32 are private model specific registers that can only be accessed by the processor 10. The private model specific register does not open its address to the modules other than processor 10. In other words, other devices or modules other than the processor 10 cannot access the private model specific registers.

In one embodiment, some model specific registers provide an external interface, and expose the address to a module other than the processor 10 for reading and writing. Therefore, the model specific register used to store the key must be a private model specific register. However, in addition to the private model specific registers, it is also possible to place the symmetric wrapping key SWK in the storage space of the non-core component (i.e., the "uncore" portion) of the single core or multi-core processor. The "uncore" portion refers to a circuit portion other than the processing core 90 in the package of the processor 10. In other words, the symmetric wrapping key SWK must be stored in a particular storage space that is not exposed to the outside of the package of the processor 10.

In one embodiment, the symmetric encryption algorithm (e.g., SM1, SM4, SM7, ZUC, Advanced Encryption Standard (AES), etc.) uses the same symmetric wrapping key SWK during encryption and decryption. Therefore, the symmetric wrapping key SWK needs to be strictly kept secret. In addition, the technique of the present invention can also be used to save the password.

In one embodiment, SM2 and SM9 are asymmetric encryption algorithms, and the asymmetric encryption algorithm usually includes a public key and a private key. In addition, the private key may also be saved by using the technology of the present invention. However, since this type of private key often requires a large storage space, a plurality of model specific registers (for example, two 128-bit model specific registers 30 and 31) can be used as the storage.

In one embodiment, the calling mode of the SM4 instruction in the hardware-acceleration instruction-set 50 includes at least two types. One is the normal mode of the SM4 instruction. In this mode, the SM4 instruction only decrypts the user private key PK. Another is a special mode of the SM4 instruction. In this special mode, the SM4 instruction can decrypt the user private key PK and then use the user private key PK for encryption and decryption.

The normal mode of the first SM4 instruction is detailed below. When the application 70 runs to a certain stage and needs to use its user private key PK to encrypt and decrypt data. The application 70 calls or invokes the hardware-acceleration instruction-set driver 60 to trigger the processor 10 to execute the SM4 instruction (the normal mode SM4 instruction) to complete the desired operation. At the time of the call, the application 70 passes the wrapped private key WPK and the dynamic handle corresponding to the symmetric wrapping key SWK as parameters to the hardware-acceleration instruction-set driver 60. The hardware-acceleration instruction-set driver 60 in turn organizes these parameters into the register values required by the SM4 instructions. For example, it is identified by some general-purpose processor registers, such as "EAX=1", "EBX=SWK handle", "ECX=WPK". In addition, "EAX=1" indicates that the SM4 instruction at this time is in "normal mode". In this mode, the processing core 90 of the processor 10 reads the value in the "EBX" as a dynamic handle to find a model specific register corresponding to the symmetric wrapping key SWK stored in the processor 10 (for example, model specific register 31) when executing the SM4 instruction. The symmetric wrapping key SWK is then retrieved from the model specific register, and the wrapped private key WPK pointed to by "EDX" is decrypted by using the symmetric wrapping key SWK to obtain the user private key PK. The processing core 90 then decrypts the wrapped private key WPK pointed to by "EDX" using the symmetric wrapping key SWK to obtain the user private key PK. Of course, in this mode, in order to ensure the security of the user private key PK obtained by decryption, the user private key PK must also be stored in one of the model specific registers 30 to 32. The processing core 90 then invokes the normal mode SM4 instruction (or other encryption and decryption instructions in the hardware-acceleration instruction-set, depending on which cryptographic algorithm uses the user private key PK) again to encrypt and decrypt the data to be encrypted and decrypted by the user using the user private key PK.

In other words, the application 70 invokes the hardware-acceleration instruction-set driver 60 by using the dynamic handle and wrapped private key WPK to cause the processor 10 to retrieve the symmetric wrapping key SWK from the model specific register 31 represented by the dynamic handle when the decryption instruction SM4 is executed. The processor 10 then decrypts the wrapped private key using the symmetric wrapping key SWK to obtain the user private key PK.

The special mode of the second SM4 instruction is detailed below. When an application (e.g., for application 70) runs to a certain stage and needs to use its user private key PK to encrypt and decrypt data, application 70 invokes hardware-acceleration instruction-set driver 60 to trigger the processor 10 to execute SM4 instruction (non-normal mode SM4 instruction) to complete the desired operation. At the time of the call, the application 70 uses the data to be encrypted and decrypted by the user, the wrapped private key WPK and the dynamic handle corresponding to the symmetric wrapping key SWK as parameters to call the hardware-acceleration instruction-set driver 60, which in turn organizes these parameters into the register values required for the special mode of SM4. For example, it is identified by some general-purpose registers. In one embodiment, the method for identifying the general-purpose register value is, for example, "EAX=2", "EBX=SWK handle", "ECX="data block address to be encrypted"", "EDX=WPK". "EAX=2" indicates that the SM4 instruction at this time is in "special mode". In this special mode, the processing core 90 of the processor 10 reads the value in the parameter "EBX" as a dynamic handle when executing the SM4 instruction, which is used to find a model specific register (for example, a model specific register 30) corresponding to the storage of the symmetric wrapping key SWK in the processor 10. The processing core 90 retrieves the symmetric wrapping key SWK from the model specific register 30. The processing core 90 then uses the symmetric wrapping key SWK to decrypt the wrapped private key WPK pointed to by the parameter "EDX" to obtain the user private key PK that the application 70 actually uses. The processing core 90 then uses the user private key PK to encrypt and decrypt the data pointed to by the address stored in the parameter "EBX".

In other words, the application 70 invokes the hardware-acceleration instruction-set driver 60 by using a dynamic handle, a to-be-processed data address and a wrapped private key WPK, such that the processor 10 reads the symmetric wrapping key SWK from the model specific register 30 represented by the dynamic handle when the decryption instruction SM4 is executed. The processor 10 then decrypts the wrapped private key WPK by using the symmetric wrapping key SWK to obtain the user private key PK. The processor 10 then uses the user private key PK to perform encryption and decryption processing on the data stored in the to-be-processed data address.

In one embodiment, when the hardware-acceleration instruction-set driver 60 invokes the encryption/decryption instruction, such as SM4 instruction in the hardware-acceleration instruction-set 50, the SM4 instruction is used as a macro instruction. In the pipeline of the processing core 90 of the processor 10, when the SM4 instruction is executed into the decode stage, it enters its microcode (ucode) read-only memory (ROM) (not shown). The processing core 90 retrieves the microcode associated with the SM4 instruction from the microcode read-only memory. In addition, the processing core 90 sends part of the microcode to the backend of the pipeline for execution. Therefore, in the stages of the rename cycle, the dispatch cycle, and the execution cycle in the pipeline operation, the above operation of obtaining the user private key PK is implemented and/or further processing the encryption and decryption for the data stored in the to-be-processed data address by using the user private key PK. In other words, these operations are performed after the SM4 microcode is retrieved from the microcode read-only memory.

In one embodiment, although the storage space in the processor 10 is limited, by using the CPU private key CPK, some temporarily unused symmetric wrapping keys SWK can use the encryption instruction (for example, the SM4 encryption instruction) in the hardware-acceleration instruction-set to encrypt and then store in the memory or the external storage 20 after being encrypted by using the CPU private key CPK. The next time that the temporarily unused symmetric wrapping keys SWK need to be used, the hardware-acceleration instruction-set driver 60 retrieves them from memory or external storage 20 and then invokes the encryption and decryption instruction (such as the SM4 encryption and decryption instruction) in the hardware-acceleration instruction-set to decrypt. This ensures the security of the symmetric wrapping key SWK and implements the scalability of the key storage space. The CPU private key CPK is generated by the internal circuit of the processor 10, such as a random number generator (not shown). Therefore, the CPU private key CPK is never exposed to the outside of the processor 10, it can ensure its security.

Figure 2:
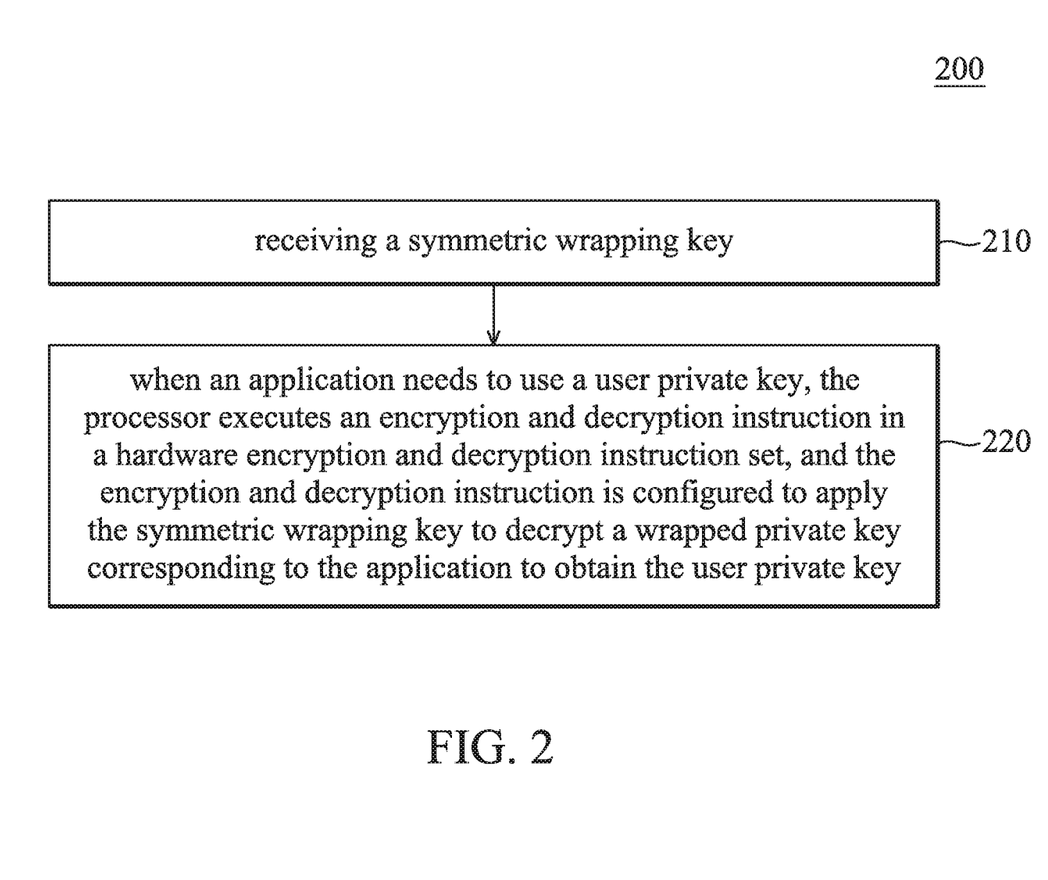
FIG. 2 is a flowchart of a method for decrypting a wrapped private key to obtain a user private key in accordance with one embodiment of the present disclosure.

FIG. 2 is a flowchart of a method 200 for decrypting a wrapped private key WPK to obtain a user private key PK in accordance with one embodiment of the present disclosure.

In step 210, the processor 10 receives a symmetric wrapping key SWK.

In one embodiment, the processor 10 receives a symmetric wrapping key SWK from external key server 80. The external key server 80 may be a hardware security module (HSM) or a key management interoperability protocol server (KMIPS). However, the present invention does not limit thereto. In addition, the external key server 80 can also apply other key management devices.

In one embodiment, the application 70 invokes the hardware-acceleration instruction-set driver 60 and imports the symmetric wrapping key SWK from the external key server 80 using a key import protocol.

In one embodiment, after the processor 10 receives the symmetric wrapping key SWK from the external key server 80, the microcode (also called ucode) stored in the microcode read-only memory of the processing core 90 of the processor 10 designates a model specific register to store the symmetric wrapping key SWK (e.g., designating a model specific register 30). In other words, the microcode contained in the processing core 90 of the processor 10 designates which one of the plurality of model specific registers (e.g., the model specific registers 30 to 32) that the symmetric encryption key SWK is stored in (e.g., the model specific registers register 30). The processing core 90 triggers the hardware-acceleration instruction-set driver 60 to generate a dynamic handle corresponding to the designated model specific register 30 for the application 70.

In step 220, when an application 70 needs to use a user private key PK, the processor 10 executes an encryption and decryption instruction (for example, the SM4 encryption and decryption instruction) in a hardware-acceleration instruction-set (for example, the hardware-acceleration instruction-set 50), and the encryption and decryption instruction is configured to apply the symmetric wrapping key SWK to decrypt a wrapped private key WPK corresponding to the application 70 to obtain the user private key PK. The symmetric wrapping key SWK is stored in a model specific register (for example, the model specific register 30) of the processor 10. The processor 10 reads the symmetric wrapping key SWK from the model specific register 30 by calling the hardware-acceleration instruction-set driver 60 when executing the encryption and decryption instruction.

In one embodiment, the wrapped private key WPK and the symmetric wrapping key SWK are generated by the external key server 80. Subsequent FIG. 3 will further describe how the wrapped private key WPK and the symmetric wrapping key SWK are generated by the external key server 80 and applied to the data processing device 100.

In one embodiment, only the processor 10 is allowed to access the model specific register s (e.g., the model specific register s 30 to 32).

Figure 3:
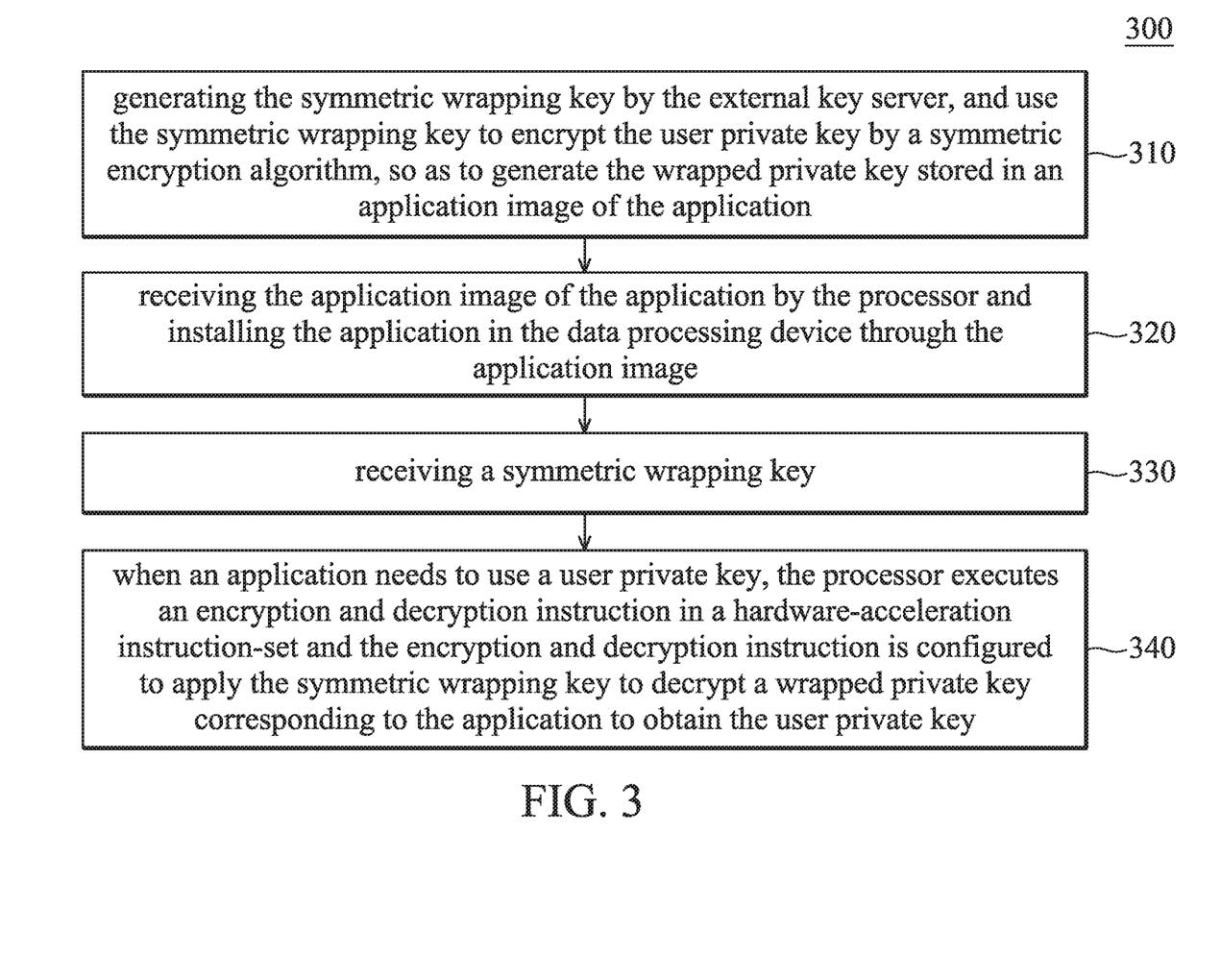
FIG. 3 is a flowchart of a method for generating a wrapped private key and a symmetric wrapping key by the external key server and applying to the data processing device 100 in accordance with one embodiment of the present disclosure.

FIG. 3 is a flowchart of a method 300 for generating a wrapped private key WPK and a symmetric wrapping key SWK by the external key server 80 and applying to the data processing device 100 in accordance with one embodiment of the present disclosure. FIG. 3 will describe in detail that how the wrapped private key WPK and the symmetric wrapping key SWK are generated by the external key server 80 and applied to the data processing device 100.

In step 310, the external key server 80 generates the symmetric wrapping key SWK, and use the symmetric wrapping key SWK to encrypt the user private key by a symmetric encryption algorithm (for example, SM4 algorithm), so as to generate the wrapped private key WPK stored in an application image of the application 70.

In one embodiment, the wrapped private key WPK is encrypted and placed in the external key server 80 together with the application image. When the user downloads the application image of the application 70, the application image and the wrapped private key WPK are downloaded from the external key server 80 to the data processing device 100.

After the step 310 is completed, the process proceeds to step 320. In step 320, the application image of the application 70 is received by the processor 10, and the application 70 is installed in the data processing device 100 through the application image. As such, the wrapped private key WPK is deployed to the data processing device 100 along with the application 70.

After the application 70 is started, the steps 330, 340 are performed. Since steps 330 and 340 are the same as steps 210 and 220 in FIG. 2, respectively, they are not described herein.

Figure 4:
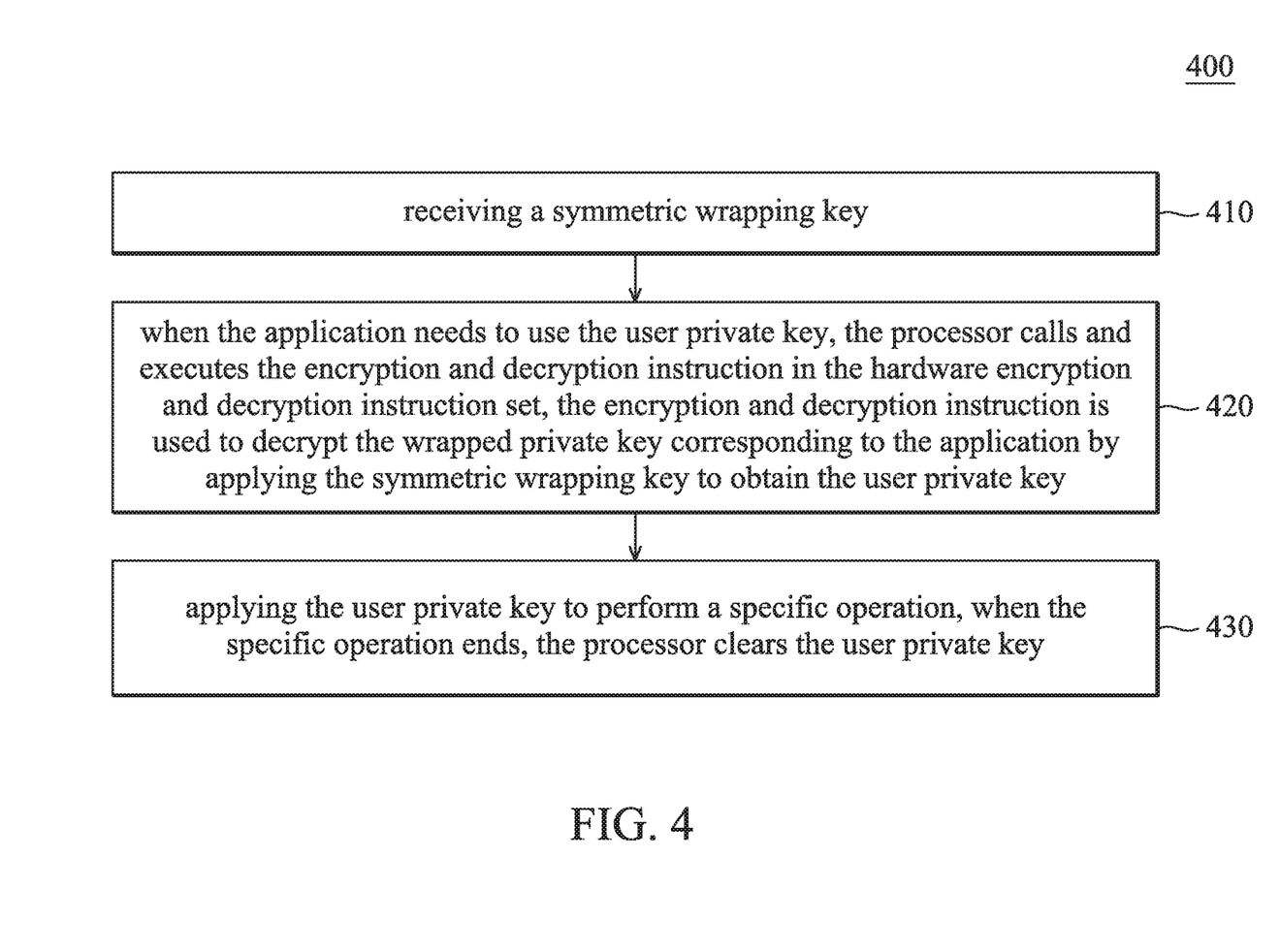
FIG. 4 is a flowchart of a method for decrypting a wrapped private key to obtain a user private key and clearing the user private key in accordance with one embodiment of the present disclosure.

Please refer to FIG. 4, which is a flowchart of a method 400 for decrypting a wrapped private key WPK to obtain a user private key PK and clearing the user private key PK in accordance with one embodiment of the present disclosure. Since step 410 in FIG. 4 is the same as step 210 in FIG. 2, it will not be described here.

In step 420, when the application 70 needs to use the user private key PK, the processor 10 invokes and executes the encryption and decryption instruction (for example, the SM4 instruction) in the hardware-acceleration instruction-set 50. The encryption and decryption instruction is used to decrypt the wrapped private key WPK corresponding to the application 70 by applying the symmetric wrapping key SWK to obtain the user private key PK. The execution process of the call is described by taking the encryption and decryption instruction as the SM4 instruction of the normal mode described above as an example. The application 70 passes the wrapped private key WPK and the dynamic handle corresponding to the symmetric wrapping key SWK as parameters to the hardware-acceleration instruction-set driver 60. The hardware-acceleration instruction-set driver 60 in turn organizes these parameters into the general-purpose register values required by the SM4 instructions. For example, "EAX=1", "EBX=SWK handle", "ECX=WPK". In addition, "EAX=1" indicates that the SM4 instruction at this time is in "normal mode". In this mode, the processing core 90 of the processor 10 reads the value in the "EBX" as a dynamic handle to find a model specific register corresponding to the symmetric wrapping key SWK stored in the processor 10 (for example, the model specific register 31) when executing the SM4 instruction. The symmetric wrapping key SWK is retrieved therefrom, and the wrapped private key WPK pointed to by "EDX" is decrypted by using the symmetric wrapping key SWK to obtain the user private key PK. Of course, in this mode, in order to ensure the security of the decrypted user private key PK, the decrypted user private key PK must also be stored in one of the model specific registers 30 to 32.

In step 430, the processor 10 applies the user private key PK to perform a specific operation. When the specific operation ends, the processor 10 clears the user private key PK to prevent it from leaking.

In one embodiment, the specific operation described in step 430 is a specific operation in the application 70. The specific operation is an operation requiring the user private key PK to be kept secret, such as "user input password for payment" or "user submit order". For example, in the payment software, the password input by the user is regarded as a kind of user sensitive information. In addition, the password can be encrypted by the user private key PK. Then, the encrypted password is submitted to the payment company for settlement. For another example, the symmetric encryption algorithm is also used when the Hypertext Transfer Protocol Secure performs Transport Layer Security (TLS) to protect the data transmitted on the network. The SM4 instruction can be used to encrypt and decrypt the data transmitted on the network using the user private key PK.

The specific operation of step 430 is to apply the user private key PK for encryption and decryption operations. It should be noted that the specific operation can be implemented by the processor 10 invoking an encryption and decryption instruction (for example, the SM4 instruction in the normal mode described above) in the hardware-acceleration instruction-set 50 again. Of course, the present invention is not limited thereto. In addition, the processor 10 can even implement the specific operation using software.

In order to ensure the security of the decrypted user private key PK, another embodiment of the present invention further proposes a special calling mode of the encryption and decryption instruction (SM4 instruction) of the hardware-acceleration instruction-set 50. The special calling mode of the encryption and decryption instruction (SM4 instruction) can complete the operations of steps 420 and 430 at the same time. Taking the SM4 instruction as an example, when the application 70 runs to a certain stage and needs to use its user private key PK to encrypt and decrypt data, the application 70 invokes the special mode SM4 instruction through the hardware-acceleration instruction-set driver 60. At the time of the call, the application 70 passes the data to be encrypted and decrypted, the wrapped private key WPK and the dynamic handle of the corresponding symmetric wrapping key SWK as parameters to the hardware-acceleration instruction-set driver 60. And then, these parameters are organized into the general-purpose register values required by the SM4 instructions. It should be noticed that the dynamic handle is generated by the hardware-acceleration instruction-set driver 60 and passed to the application 70 when the symmetric wrapping key SWK is stored in the corresponding model specific register 30. For example, the general-purpose register value is "EAX=2", "EBX=SWK handle", "ECX="data block address to be encrypted"", "EDX=WPK". In addition, "EAX=2" indicates that the SM4 instruction at this time is in "special mode". In the special mode, the processing core 90 of the processor 10 reads the value in the parameter "EBX" as a dynamic handle when executing the SM4 instruction. The dynamic handle is used to find a model specific register (for example, a model specific register 30) corresponding to the storage of the symmetric wrapping key SWK in the processor 10. The processing core 90 retrieves the symmetric wrapping key SWK from the model specific register 30, and then uses the symmetric wrapping key SWK to decrypt the wrapped private key WPK pointed to by the parameter "EDX" using the symmetric wrapping key SWK to obtain the user private key PK actually used by the application 70. The processing core 90 then uses the user private key PK to encrypt and decrypt the data pointed to by the address stored in the parameter "EBX".

In one embodiment, the processor 10 executes an encryption and decryption instruction to apply a symmetric wrapping key SWK to decrypt another wrapped private key to obtain another user private key. It can be seen that the reason for protecting the symmetric wrapping key SWK without directly protecting the user private key PK is that multiple user private keys PK can be encrypted by using the same symmetric wrapping key SWK, so as to save space in the model specific registers 30 to 32. That is, one symmetric wrapping key SWK can decrypt multiple wrapped private keys WPK to obtain multiple user private keys PK required by multiple applications.

Figure 5:
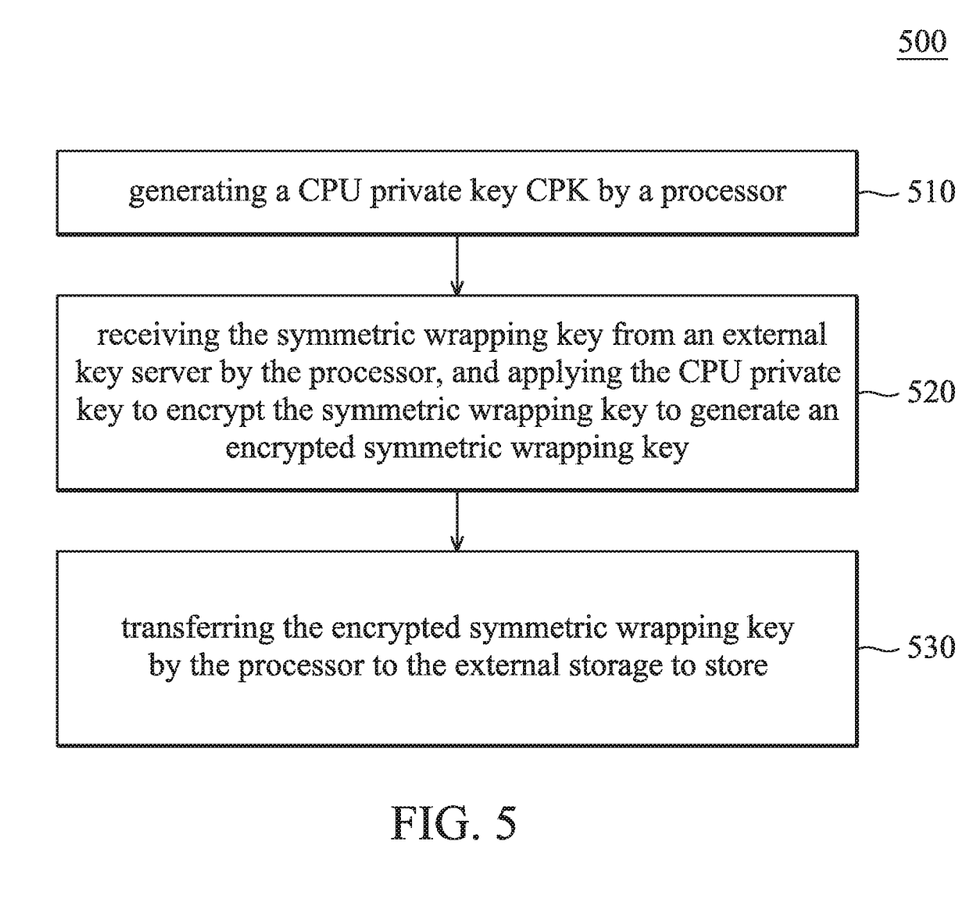
FIG. 5 is a flowchart of a method for transmitting an encrypted symmetric wrapping key to an external storage in accordance with one embodiment of the present disclosure.

Refer to FIG. 5, which is a flowchart of a method 500 for transmitting an encrypted symmetric wrapping key CPK (SWK) to an external storage 20 in accordance with one embodiment of the present disclosure.

In step 510, a CPU private key CPK is generated by a processor 10. In one embodiment, the CPU private key CPK is generated according to a random number generated by the processor 10. For example, the processor 10 internally includes a random number generator (not shown in FIG. 1). The CPU private key CPK generated by the random number generator can ensure that it can only be known by the processor 10 without being snooped by the outside. It can improve the security.

In step 520, the symmetric wrapping key SWK from an external key server 80 is received by the processor 10, and the symmetric wrapping key SWK is encrypted by applying the CPU private key CPK to generate an encrypted symmetric wrapping key CPK (SWK). It is noted that in one embodiment, the symmetric wrapping key SWK, the application 70 imports the symmetric wrapping key SWK from the external key server 80 by invoking the hardware-acceleration instruction-set driver 60 and using a key import protocol. In one embodiment, the processor 10 can call and execute one of the encryption and decryption instructions (such as the SM4 encryption and decryption instruction) in the hardware-acceleration instruction-set 50 to implement the foregoing encryption operation to the symmetric wrapping key SWK by applying the CPU private key CPK. In addition, the symmetric wrapping key SWK can be stored in a model specific register (e.g., model specific register 30) of the processor 10 prior to being encrypted and transferred to the external storage 20 to ensure that it is not snooped by the outside.

In step 530, the encrypted symmetric wrapping key CPK (SWK) is transferred by the processor 10 to the external storage 20 to store. Sensitive information (i.e., symmetric wrapping key SWK) can be encrypted into encrypted symmetric wrapping key CPK (SWK) and then transmitted to the outside of processor 10 in cipher text, which can effectively prevent unauthorized persons (such as hackers) from intercepting and interpreting the sensitive information. In the condition that where there are many symmetric wrapping keys need to be stored and the model specific registers 30 to 32 in the processor 10 have limited storage space, the symmetric wrapping keys are encrypted by the CPU private key CPK generated by the processor 10 and then stored in the external storage 20, thereby ensuring the security of the symmetric wrapping keys and realizing the scalability of the key storage space.

In one embodiment, the processor 10 further receives another symmetric wrapping key from the external key server 80. The processor 10 can use a least recently used (LRU) mode to select one of the symmetric wrapping key SWK and other symmetric wrapping keys for encryption. And then, the processor 10 transmits the encrypted symmetric wrapping key CPK (SWK) to the external storage to store.

Figure 6A:
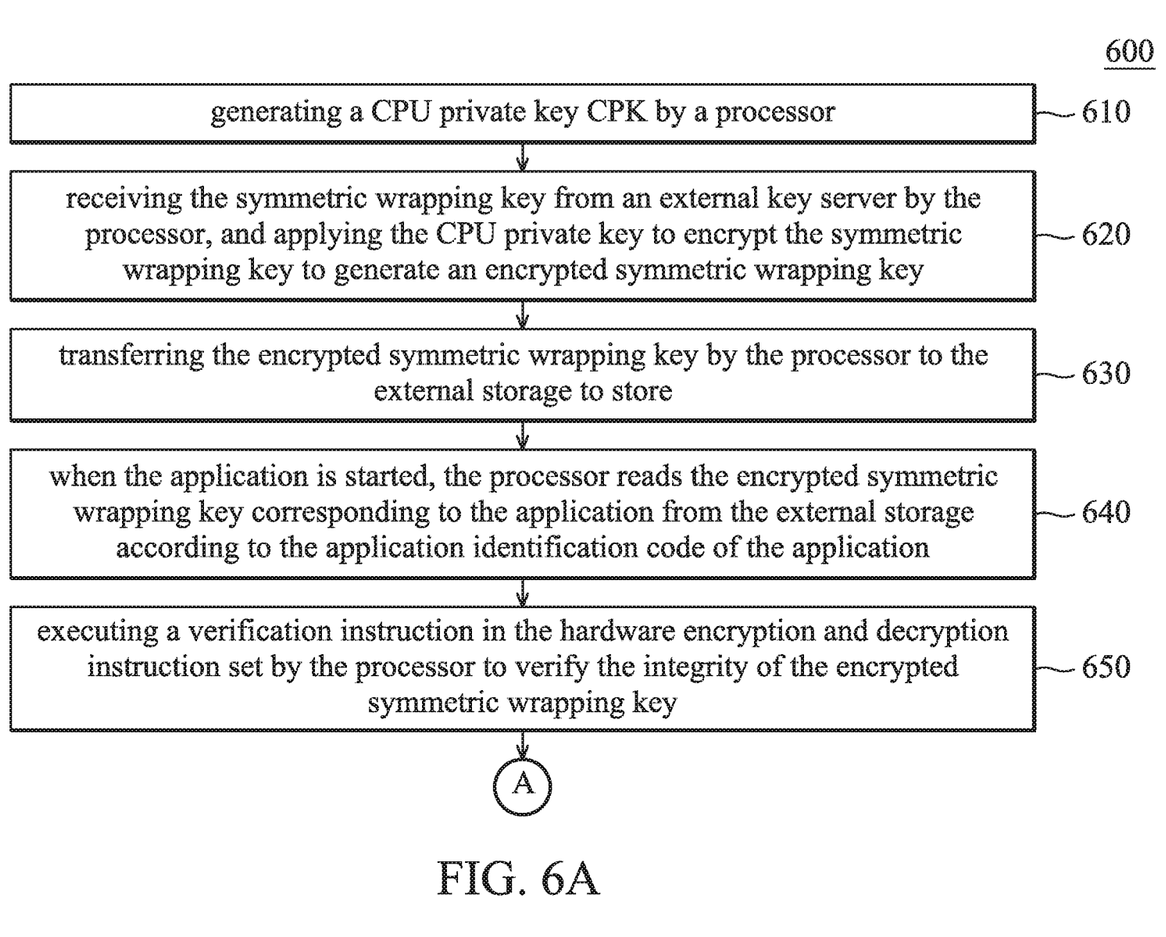
FIGS. 6A-6B are flowcharts of a data processing method in accordance with one embodiment of the present disclosure.
Figure 6B:
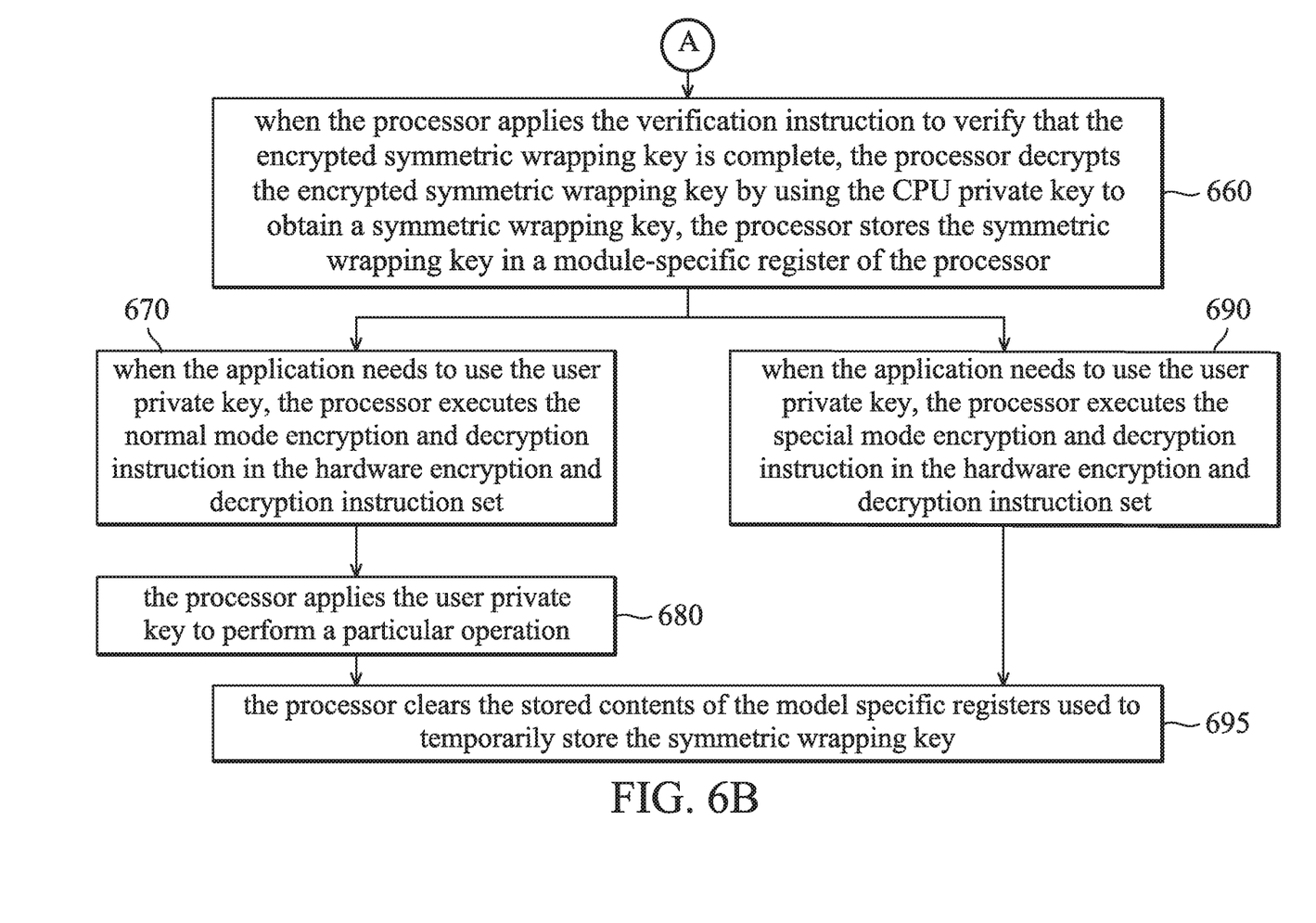

In one embodiment, the processor 10 further receives another symmetric wrapping key from the external key server 80. These different symmetric wrapping keys SWK can correspond to different applications (such as application 70 and application 71 shown in FIG. 1) or can correspond to the same application. Therefore, the encrypted symmetric wrapping key CPK (SWK) generated in step 520 further includes an application code identification AppID. The application identification code AppID identifies which application the encrypted symmetric wrapping key CPK(SWK) corresponds to. Please refer to FIGS. 6A-6B, FIGS. 6A-6B are flowcharts of a data processing method 600 in accordance with one embodiment of the present disclosure. Since steps 610, 620, and 630 in FIG. 6A are the same as steps 510, 520, and 530 in FIG. 5, respectively, they are not described herein.

In step 640, when the application 70 is started, the processor 10 reads the encrypted symmetric wrapping key CPK (SWK) corresponding to the application 70 from the external storage 20 according to the application identification code AppID of the application 70. Although the encrypted symmetric wrapping key CPK (SWK) is an symmetric wrapping key SWK, that is, the encrypted symmetric wrapping key CPK (SWK) is cipher text, in one embodiment, it may still be stored in a model specific register (e.g., model specific register 30) to ensure that it is not snooped by the outside.

In step 650, the processor 10 executes a verification instruction (such as an SM3 instruction) in the hardware-acceleration instruction-set 50 to verify the integrity of the encrypted symmetric wrapping key CPK (SWK). Of course, the step 650 can also be omitted in certain embodiments.

In step 660, when the processor 10 applies the verification instruction (such as SM3 instruction) to verify that the encrypted symmetric wrapping key CPK (SWK) is complete, the processor 10 decrypts the encrypted symmetric wrapping key CPK (SWK) by using the CPU private key CPK to obtain a symmetric wrapping key SWK. The processor 10 stores the symmetric wrapping key SWK in a model specific register of the processor 10 (e.g., model specific register 30).

In one embodiment, if the processor 10 invokes the encryption and decryption instruction (such as the SM4 encryption and decryption instruction) in the hardware-acceleration instruction-set 50 to perform the encryption operation in step 620, the hardware-acceleration instruction-set 50 is also invoked in step 660. The decryption operation is also implemented in step 660 by calling the same encryption and decryption instruction (such as the SM4 encryption and decryption instruction) in the hardware-acceleration instruction-set 50. Of course, the processor 10 can also implement the encryption and decryption operations of step 620 and step 660 by conventional software encryption and decryption methods, and the invention is not limited herein.

In one embodiment, the processor 10 further includes a microcode (or ucode), the microcode designates a model specific register (for example, a model specific register 30) for storing the symmetric wrapping key SWK. The processor 10 further generates a dynamic handle to the corresponding application 70 by the hardware-acceleration instruction-set driver 60 corresponding to the model specific register 30.

In one embodiment, after performing step 660, the flowchart of FIG. 6B can continue to perform step 220 of FIG. 2 (or step 340 of FIG. 3 or steps 420-430 of FIG. 4). In FIG. 6B, after performing step 660, depending on the mode of the encryption and decryption instruction executed by the processor 10 (for example, the normal mode or the special mode as described above), step 670 and the next step 680, or step 690 are selectively performed. In step 670, when the application 70 needs to use the user private key PK, the processor 10 executes the normal mode encryption and decryption instruction (for example, the normal mode of SM4 encryption and decryption instruction) in the hardware-acceleration instruction-set 50. Specifically, the application 70 invokes the hardware-acceleration instruction-set driver 60 using a dynamic handle and a wrapped private key WPK as parameters to trigger the processor 10 to execute the normal mode of encryption and decryption instruction (for example, the normal mode of SM4 encryption and decryption instruction) in the hardware-acceleration instruction-set 50. The normal mode encryption and decryption instruction is used to read the symmetric wrapping key SWK from the model specific register 30 represented by the dynamic handle, and decrypt the wrapped private key WPK by using the symmetric wrapping key SWK to obtain the user private key PK. The dynamic handle is generated by the processor 10 through the hardware-acceleration instruction-set driver 60 in step 660. In addition, the dynamic handle indicates reading the symmetric wrapping key SWK from which model specific register (such as the model specific register 30) from the model specific registers 30 to 32. As described above, the model specific register 30 is designated by the microcode included in the processor 10. And then, the step 680 is performed. In step 680, the processor 10 applies the user private key PK to perform a particular operation. If the user chooses to invoke the encryption and decryption instruction to execute the special mode, then the step 660 is performed.

And then, the process proceeds to step 690. In step 690, when the application 70 needs to use the user private key PK, the processor 10 executes the special mode encryption and decryption instruction in the hardware-acceleration instruction-set 50 (such as the special mode of SM4 encryption and decryption instruction). Specifically, when the application 70 needs to use the user private key PK, the application 70 invokes the hardware-acceleration instruction-set driver 60 using a dynamic handle, a to-be-processed data address and a wrapped private key WPK to trigger the processor 10 to execute the special mode of SM4 decryption instruction. The processor 10 reads the symmetric wrapping key SWK from the model specific register 30 represented by the dynamic handle. The processor 10 decrypts the wrapped private key WPK by using the symmetric wrapping key SWK to obtain the user private key PK. The processor 10 then uses the user private key PK to perform encryption and decryption processing on the data stored in the to-be-processed data address.

After the step 680 or 690 is performed, the step 695 is performed. In step 695, the processor 10 clears the stored contents of the model specific registers used to temporarily store the symmetric wrapping key SWK.

In one embodiment, the processor 10 can complete the above operations of obtaining the user private key PK by performing a rename cycle, a dispatch cycle, and/or an execution cycle after using microcode to execute the decryption instruction (such as the SM4 instruction).

Figure 7:
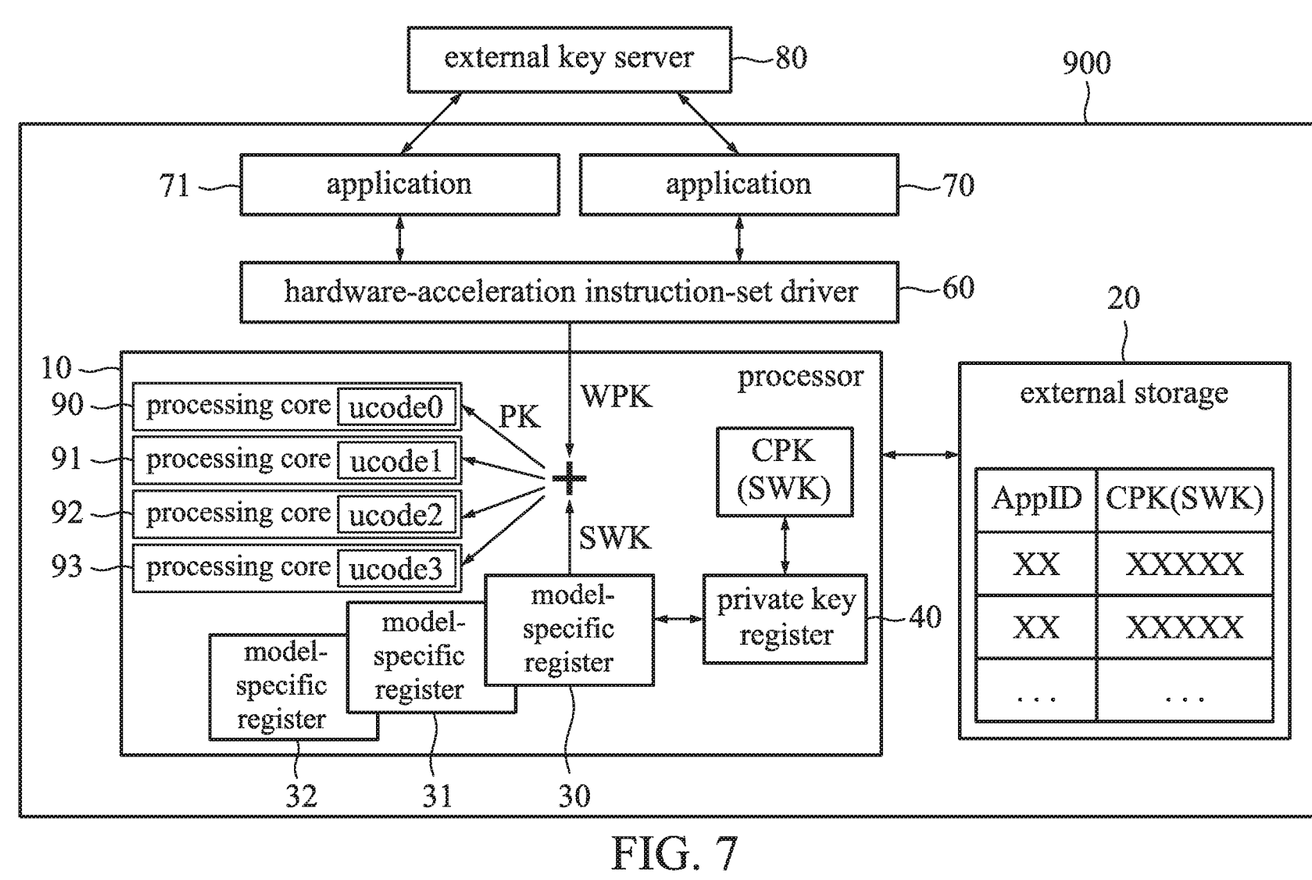
FIG. 7 is a block diagram of a data processing device in accordance with another embodiment of the present invention.

Refer to FIG. 7, which is a block diagram of a data processing device 900 in accordance with another embodiment of the present invention. The data processing device 900 includes a processor 10 and an external storage 20. The difference between FIG. 7 and FIG. 1 is that the processor 10 can be a multi-core processor. The processor 10 includes a plurality of processing cores 90 to 93. The processing core 90 contains ucode 0. The processing core 91 includes the microcode ucode 1 stored in the microcode read-only memory. The processing core 92 includes the microcode ucode 2 stored in the microcode read-only memory. The processing core 93 includes the microcode ucode 3 stored in the microcode read-only memory. The plurality of processing cores 90 to 93 of FIG. 7 can independently perform all operations performed by the processing core 90 of FIG. 1, respectively. In addition, each of the plurality of processing cores 90 to 93 can individually access the model specific registers 30 to 32. In other words, the special module registers 30 to 32 are shared by the plurality of processing cores 90 to 93.

In summary, the data processing system and the data processing method of the present invention realize the storage of a symmetric wrapping key by a model specific register with a high internal security level of the processor, thereby improving the security of the symmetric wrapping key. In addition, when there are many symmetric wrapping keys to be stored, and the storage space of model specific register inside the processor is limited, the symmetric wrapping key is encrypted by the CPU private key generated by the processor and then stored in external storage. In addition, the security of the symmetric wrapping key is ensured, and the scalability of the key storage space is realized. With regard to other additional features and advantages of the present invention, those skilled in the art, without departing from the spirit and scope of the application. It can be obtained by making some changes and retouching according to the data processing device and the data processing method disclosed in the implementation method of the present invention.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of other implementations as may be desired and advantageous for any given or particular application.

What is claimed is:

1. A data processing device, comprising:
a processor, configured to receive a symmetric wrapping key, when an application needs to use a user private key, the processor executes an encryption and decryption instruction in a hardware-acceleration instruction-set; the encryption and decryption instruction is configured to apply the symmetric wrapping key to decrypt a wrapped private key corresponding to the application to obtain the user private key;
wherein the symmetric wrapping key is stored in a model specific register of the processor;
wherein the processor applies the user private key to perform a specific operation, and when the specific operation ends, the processor clears the user private key;
wherein the application invokes a hardware-acceleration instruction-set driver by using a dynamic handle and the wrapped private key, when the processor executes the encryption and decryption instruction, the symmetric wrapping key is read from the model specific register represented by the dynamic handle, the processor applies the symmetric wrapping key to decrypt the wrapped private key to obtain the user private key.

2. The data processing device of claim 1, wherein the processor receives the symmetric wrapping key from an external key server.

3. The data processing device of claim 2, wherein the external key server is configured to generate the symmetric wrapping key, and use the symmetric wrapping key to encrypt the user private key using a symmetric encryption algorithm, so as to generate the wrapped private key stored in an application image of the application.

4. The data processing device of claim 2, wherein the application invokes a hardware-acceleration instruction-set driver and uses a key import protocol to import the symmetric wrapping key from the external key server.

5. The data processing device of claim 1, wherein only the processor is allowed to access the model specific register.

6. The data processing device of claim 1, wherein the processor comprises a microcode, the microcode designates the model specific register for storing the symmetric wrapping key, and a hardware-acceleration instruction-set driver generates a dynamic handle and sends the dynamic handle to the application; wherein the dynamic handle is generated so that it corresponds to the designated model specific register.

7. The data processing device of claim 1, wherein the application invokes a hardware-acceleration instruction-set driver by using a dynamic handle, a to-be-processed data address and the wrapped private key, the processor reads the symmetric wrapping key from the model specific register represented by the dynamic handle when executing the encryption and decryption instruction, and the processor decrypts the wrapped private key by using the symmetric wrapping key to obtain the user private key, and then encrypts and decrypts data stored in the to-be-processed data address by using the user private key.

8. The data processing device of claim 1, wherein the processor executes the encryption and decryption instruction to apply the symmetric wrapping key to decrypt another wrapped private key to obtain another user private key.

9. The data processing device of claim 1, wherein the application invokes a hardware-acceleration instruction-set driver to trigger the processor to read the symmetric wrapping key from the model specific register when executing the encryption and decryption instruction.

10. A data processing method, comprising:
receiving a symmetric wrapping key by a processor; and
when an application needs to use a user private key,
executing an encryption and decryption instruction in a hardware-acceleration instruction-set by the processor; wherein the encryption and decryption instruction is configured to apply the symmetric wrapping key to decrypt a wrapped private key corresponding to the application to obtain the user private key; wherein the symmetric wrapping key is stored in a model specific register of the processor; and
applying the user private key to perform a specific operation by the processor; and
when the specific operation ends, clearing the user private key by the processor;
wherein the step of executing the encryption and decryption instruction in the hardware-acceleration instruction-set by the processor further comprises:
invoking a hardware-acceleration instruction-set driver by using a dynamic handle and the wrapped private key via the application,
reading the symmetric wrapping key from the model specific register represented by the dynamic handle; and
applying the symmetric wrapping key to decrypt the wrapped private key to obtain the user private key.

11. The data processing method of claim 10, wherein the processor receives the symmetric wrapping key from an external key server.

12. The data processing method of claim 11, wherein the external key server is configured to generate the symmetric wrapping key, and use the symmetric wrapping key to encrypt the user private key using a symmetric encryption algorithm, so as to generate the wrapped private key stored in an application image of the application.

13. The data processing method of claim 11, wherein the application invokes a hardware-acceleration instruction-set driver and uses a key import protocol to import the symmetric wrapping key from the external key server.

14. The data processing method of claim 10, wherein only the processor is allowed to access the model specific register.

15. The data processing method of claim 10, wherein the processor comprises a microcode, the microcode designates the model specific register for storing the symmetric wrapping key, and a hardware-acceleration instruction-set driver generates a dynamic handle and sends the dynamic handle to the application; wherein the dynamic handle is generated so that it corresponds to the designated model specific register.

16. The data processing method of claim 10, wherein the step of executing the encryption and decryption instruction in the hardware-acceleration instruction-set by the processor further comprises:
invoking a hardware-acceleration instruction-set driver by using a dynamic handle, a to-be-processed data address and the wrapped private key via the application;
reading the symmetric wrapping key from the model specific register represented by the dynamic handle;
decrypting the wrapped private key by using the symmetric wrapping key to obtain the user private key; and
using the user private key to encrypt and decrypt data stored in the to-be-processed data address.

17. The data processing method of claim 10, further comprising:
executing the encryption and decryption instruction to apply the symmetric wrapping key to decrypt another wrapped private key to obtain another user private key by the processor.

18. The data processing method of claim 10, wherein the application invokes a hardware-acceleration instruction-set driver to trigger the processor to read the symmetric wrapping key from the model specific register when executing the encryption and decryption instruction.

* * * * *